US008566430B2

(12) United States Patent
Song et al.

(10) Patent No.: US 8,566,430 B2
(45) Date of Patent: Oct. 22, 2013

(54) APPARATUS AND METHOD FOR DETERMINING HEARTBEAT INTERVAL OF ACTIVESYNC SERVICE IN WIRELESS COMMUNICATION SYSTEM

(75) Inventors: Jung-Kee Song, Gyeonggi-do (KR); Ashish Kumar Verma, Dhanbad (IN)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 318 days.

(21) Appl. No.: 12/758,976

(22) Filed: Apr. 13, 2010

(65) Prior Publication Data

US 2010/0262680 A1 Oct. 14, 2010

(30) Foreign Application Priority Data

Apr. 13, 2009 (KR) .................. 10-2009-0031745

(51) Int. Cl.
*G06F 15/16* (2006.01)
(52) U.S. Cl.
USPC .......................................... 709/221; 709/228
(58) Field of Classification Search
USPC .................................. 709/220, 221, 227, 228
See application file for complete search history.

(56) References Cited

U.S. PATENT DOCUMENTS

| 7,917,613 | B2* | 3/2011 | Letca et al. | 709/224 |
|---|---|---|---|---|
| 2002/0152446 | A1* | 10/2002 | Fleming | 714/815 |
| 2006/0248522 | A1* | 11/2006 | Lakshminarayanan et al. | 717/174 |
| 2007/0180077 | A1* | 8/2007 | Letca et al. | 709/223 |
| 2008/0165796 | A1 | 7/2008 | Martinez et al. | |
| 2010/0146324 | A1* | 6/2010 | Sajassi et al. | 714/2 |
| 2011/0145404 | A1* | 6/2011 | Gingell et al. | 709/224 |

OTHER PUBLICATIONS

Microsoft; "Windows Mobile 6: Deploying Windows Mobile 6 Powered Devices With Microsoft Exchange Server 2007;" Dec. 31, 2007; XP 002612276.

* cited by examiner

*Primary Examiner* — David Lazaro
(74) *Attorney, Agent, or Firm* — Cha & Reiter, LLC.

(57) ABSTRACT

A method and an apparatus for determining a HeartBeat Interval (HBI) of an activesync service in a wireless communication system are provided. In the method, a predetermined minimum value is set as the HBI, and transmission/reception of a ping message is performed. Whether transmission/reception of a ping message corresponding to the set HBI is performed successfully is determined. When the transmission/reception of the ping message succeeds successively within a predetermined frequency, the HBI is set to a predetermined maximum value.

12 Claims, 8 Drawing Sheets

APPARATUS AND METHOD FOR DETERMINING HEARTBEAT INTERVAL OF ACTIVESYNC SERVICE IN WIRELESS COMMUNICATION SYSTEM

CLAIM OF PRIORITY

This application claims the benefit under 35 U.S.C. §119(a) of a Korean patent application filed in the Korean Intellectual Property Office on Apr. 13, 2009 and assigned Serial No. 10-2009-0031745, the entire disclosure of which is hereby incorporated by reference.

BACKGROUND OF THE INVENTION

1. Field of the Invention

The present invention relates to an apparatus and method for determining a HeartBeat Interval (HBI) of an activesync service in a wireless communication system. More particularly, the present invention relates to an apparatus and a method for allowing a client to determine an HBI for transmission/reception of a ping message in a wireless communication system that uses an Exchange ActiveSync protocol.

2. Description of the Related Art

An Exchange ActiveSync protocol is a Microsoft Exchange synchronization protocol optimized for operating in a network having a long standby time and a narrow bandwidth, and is based on a HyperText Transfer Protocol (HTTP) and an eXtensible Markup Language (XML). The Exchange ActiveSync protocol is used for allowing a mobile terminal (referred to as an 'activesync client' hereinafter) having a browser function or a Microsoft Windows Mobile function to access information via an exchange server that executes a Microsoft Exchange.

Figure 1:
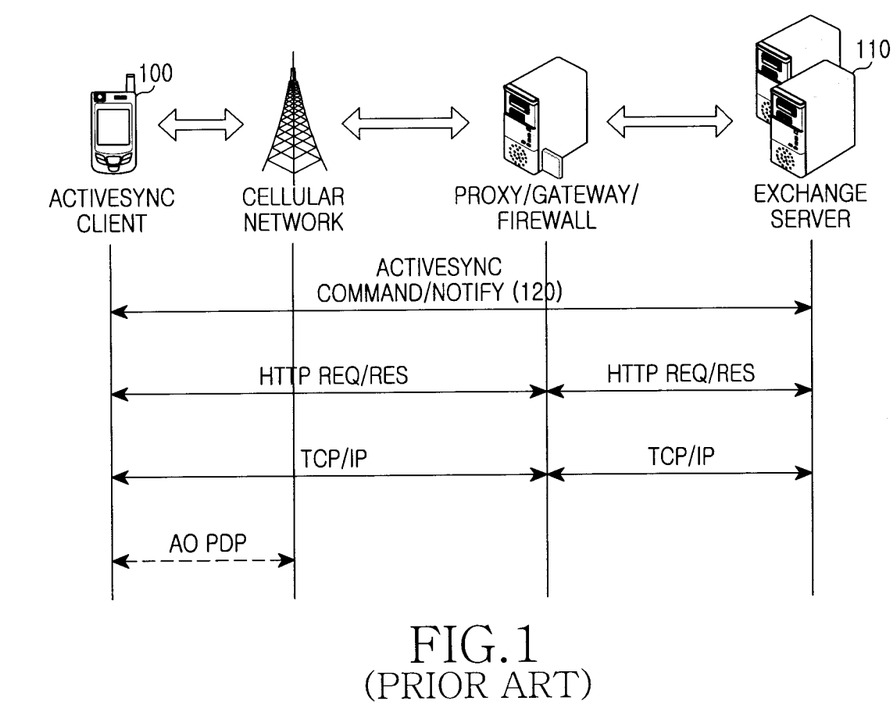
FIG. 1 is a view illustrating a construction of the conventional exchange activesync-based network.

In the conventional exchange activesync based-network illustrated in FIG. 1, an activesync client 100 and an exchange server 110 transmit/receive an ActiveSync Command/Notify message 120 to/from each other. Examples of the ActiveSync Command/Notify message include ping request/ping response messages. The ping request message monitors an account of a relevant client during a specific HBI, and when an event such as an arrival of a new mail occurs, requests the exchange server to notify the occurrence of the event. The ping response message notifies whether an event occurs in the account of a relevant client.

Figure 2:
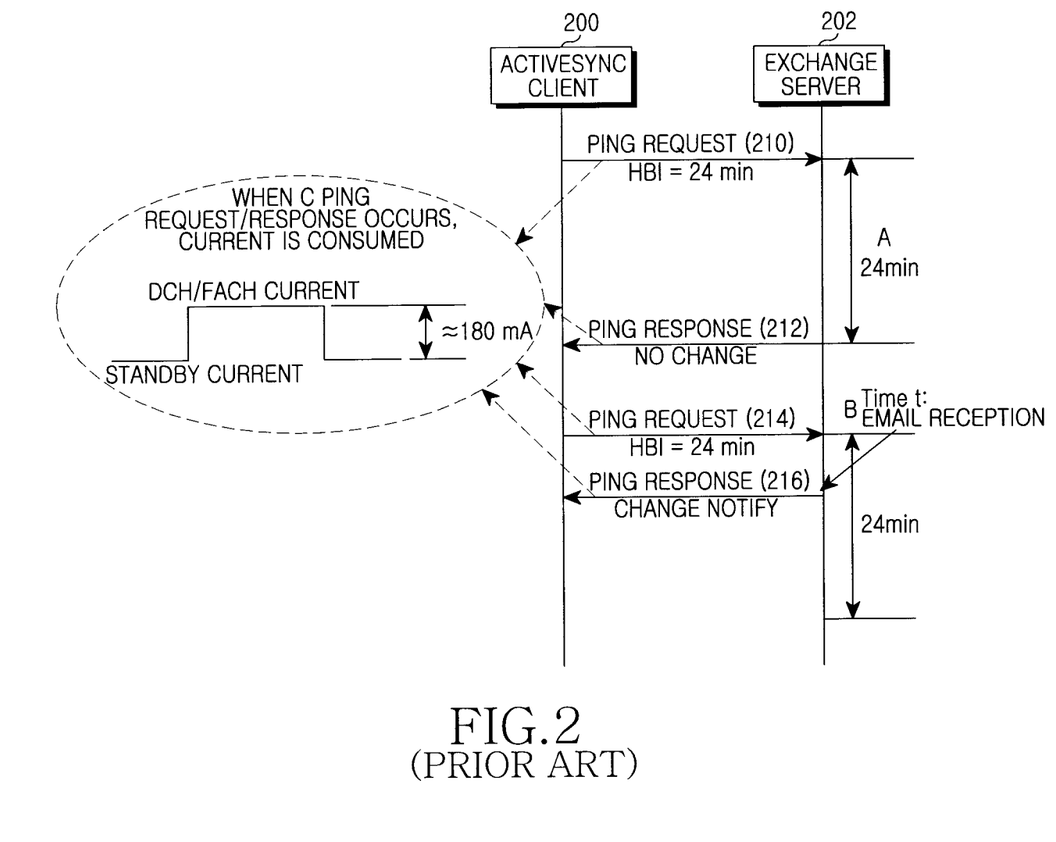
FIG. 2 is a view illustrating a transmission/reception procedure of a ping message in the conventional exchange activesync based-network.

FIG. 2 illustrates a transmission/reception procedure of a ping message in the conventional exchange activesync based-network.

Referring to FIG. 2, when an activesync client 200 transmits a ping request message including an HBI to an exchange server 202 in step 210, the exchange server 202 monitors an account of the activesync client 200 during the HBI, determines whether an event occurs, and when an event does not occur during the HBI as a result of the monitoring, transmits a ping response message informing that an event did not occur during the HBI to the activesync client 200 in step 212.

Then, the activesync client 200, in response to the ping response message, retransmits a ping request message including the HBI to the exchange server 202 in step 214. The exchange server 202 monitors the account of the activesync client 200 during the HBI. When an event occurs as a result of the monitoring, the exchange server 202 transmits a ping response message informing that the event has occurred to the activesync client 200 at the point of occurrence of the event in step 216.

As described above, the ping request and response messages may be transmitted/received frequently or sporadically depending on the HBI and whether an event occurs at a relevant account.

Meanwhile, as illustrated in FIG. 2, the activesync client 200 consumes a predetermined current whenever transmission/reception of a ping request message and a ping response message occurs. If the HBI is set a normal length, the frequency of transmission/reception of the ping request message and the ping response message reduces, so that an amount of a current consumed at the activesync client 200 may be reduced. Since the HBI is set a reasonable length, any error in the network can be detected early enough.

However, when the HBI is set too long, the current consumption increases and an error occurring due to various reasons in an actual network environment cannot be detected. That is, when the activesync client sets a maximum HBI and transmits a ping request message, the activesync client cannot detect a network error until the HBI expires, including the error that occur in the network during the HBI.

Therefore, a technique for reducing current consumption of the client and determining an HBI suitable for a network error state needs to be provided.

SUMMARY OF THE INVENTION

Accordingly, an aspect of the present invention is to provide an apparatus and a method for determining an HBI of an activesync service in a wireless communication system and optimally controlling an amount of current consumed by an activesync client.

Another aspect of the present invention is to provide an apparatus and a method for allowing a client to determine an HBI for transmission/reception of a ping message in a wireless communication system that uses an Exchange ActiveSync protocol.

Still another aspect of the present invention is to provide an apparatus and a method for allowing a client to determine an HBI with consideration of a network state in a wireless communication system that uses an Exchange ActiveSync protocol.

Yet another aspect of the present invention is to provide an apparatus and a method for determining an HBI of a ping by determining whether transmission/reception of a ping message succeeds or fails successively within a predetermined frequency in a wireless communication system that uses an Exchange ActiveSync protocol.

Further aspect of the present invention is to provide an apparatus and a method for determining an HBI using a binary search technique in a wireless communication system that uses an Exchange ActiveSync protocol.

In accordance with an aspect of the present invention, a method of a client terminal, for determining a HeartBeat Interval (HBI) of a ping in a wireless communication system is provided. The method includes setting a predetermined minimum value as the HBI and trying transmission/reception of a ping message, determining whether transmission/reception of a ping message corresponding to the set HBI is performed successfully, and when the transmission/reception of the ping message succeeds successively within a predetermined frequency, setting the HBI to a predetermined maximum value.

In accordance with another aspect of the present invention, an apparatus of a client terminal, for determining a HeartBeat Interval (HBI) of a ping in a wireless communication system is provided. The apparatus includes a transceiver for transmitting/receiving a ping message to/from an exchange server, and a controller for setting a predetermined minimum value as an HBI, performing transmission/reception of a ping message, determining whether transmission/reception of a ping message corresponding to the set HBI is performed successfully, and when the transmission/reception of the ping message succeeds successively within a predetermined frequency, setting the HBI to a predetermined maximum value.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Exemplary embodiments of the present invention provide an apparatus and a method for determining an optimum HBI through two phases of controlling an HBI of a ping by determining whether transmission/reception of a ping message succeeds or fails successively within a predetermined frequency, and controlling an HBI using a binary search technique in a wireless communication system that uses an Exchange ActiveSync protocol.

Hereinafter, for illustrative purposes, a scenario where a push mode, where new messages get sent by the server whether wanted or not, is set in a client that receives a direct email push service, and a ping message is transmitted/received in order to receive information that an Electronic (E)-mail has been received in an account of the relevant client is exemplarily described. However, it should be noted that the exemplary embodiment of the present invention is applicable to other mode and all applications that use the Exchange ActiveSync protocol.

Figure 3:
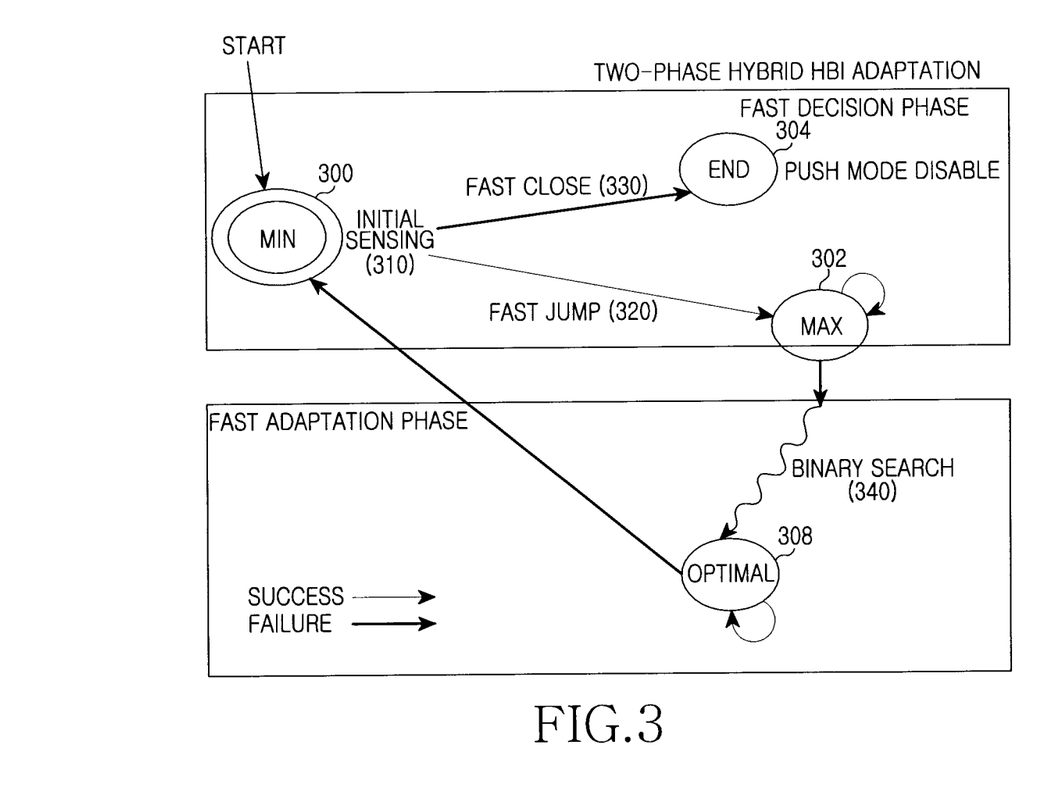
FIG. 3 is a view illustrating an HBI adaptive control technique of two phases in an exchange activesync based-network according to an exemplary embodiment of the present invention.

FIG. 3 is a view illustrating an HBI adaptive control technique of two phases in an exchange activesync based-network according to an exemplary embodiment of the present invention.

As shown, an exemplary embodiment of the present invention includes a fast decision phase of controlling an HBI of a ping by determining whether transmission/reception of a ping message succeeds or fails within a predetermined frequency, and a fast adaptation phase of controlling the HBI using a binary search technique.

The fast decision phase includes an initial sensing phase 310 for setting an HBI to a predetermined minimum value 300 and detecting whether transmission/reception of a ping message succeeds, a fast jump phase 320 for changing the HBI to a predetermined maximum value 302 when the transmission/reception of the ping message succeeds successively within a predetermined frequency, and a fast close phase 330 for ending (304) the push mode for transmitting/receiving the ping message when the transmission/reception of the ping message fails successively within the predetermined frequency.

The fast adaptation phase includes a phase 340 for searching for an optimal HBI 308 between the minimum value 300 and the maximum value 302 using a binary search technique when the transmission/reception of the ping message fails after the HBI is set to the maximum value 302 in the fast decision phase. The binary search technique is described in more detail with reference to FIG. 6.

Figure 4:
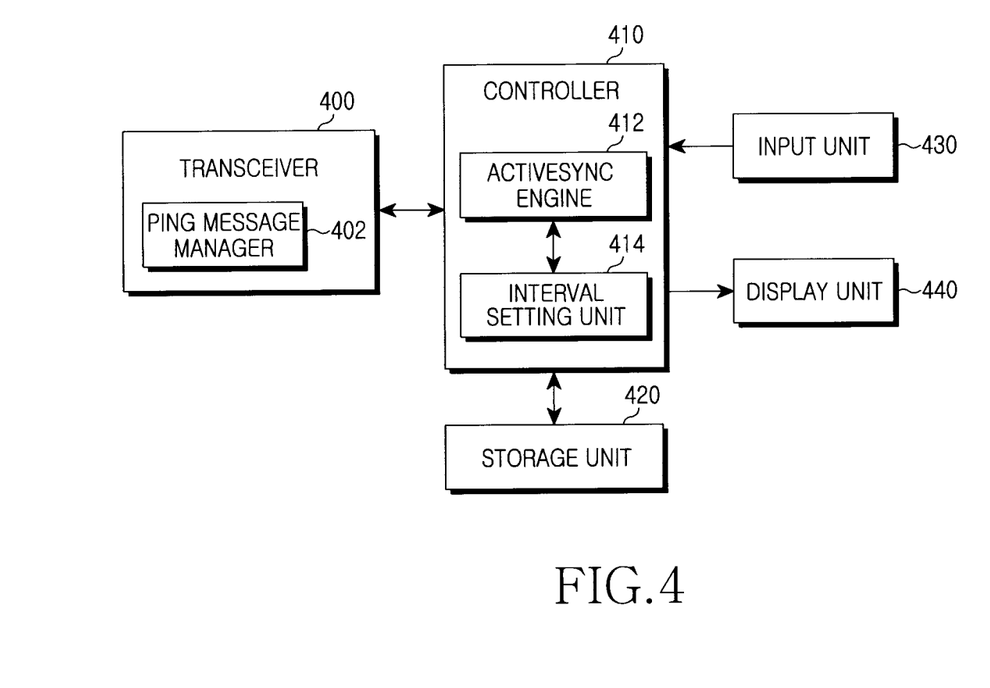
FIG. 4 is a block diagram illustrating a client in an exchange activesync based-network according to an exemplary embodiment of the present invention.

FIG. 4 is a block diagram illustrating a client in an exchange activesync based-network according to an exemplary embodiment of the present invention.

Referring to FIG. 4, the client includes a transceiver 400, a controller 410, a storage unit 420, an input unit 430, and a display unit 440. More particularly, according to an exemplary embodiment of the present invention, the transceiver 400 includes a ping message manager 402. The controller 410 includes an activesync engine 412 and an interval setting unit 414.

In operation, the transceiver 400 transmits/receives a radio signal of data input/output via an antenna. More particularly, the transceiver 400 transmits a ping request message to an exchange server via a sync protocol, and receives a ping response message from the exchange server and provides the same to the controller 410 under control of the controller 410 by including the ping message manager 402.

The controller 410 controls and processes an overall operation of the client, and performs functions for determining an optimal HBI (an HBI) with consideration of a network state by including the activesync engine 412 and the interval setting unit 414.

The activesync engine 412 controls and processes operations related to an application that uses an exchange activesync protocol, an operation for transmitting a ping request message including an HBI set by the interval setting unit 414, determines whether transmission/reception of a ping message succeeds by detecting whether a ping response message is received from the exchange server during the set HBI, and provides a result of the determination to the interval setting unit 414. Here, when a signal informing ending of the push mode is provided by the interval setting unit 414, the activesync engine 412 controls the display unit 440 to display a message recommendation to end the push mode because a current network state is not suitable for a push mode use.

The interval setting unit 414 maintains or changes an HBI depending on a determination result of the success or failure of transmission/reception of a ping message provided by the activesync engine 412. Here, the interval setting unit 414 maintains or changes the HBI using the method illustrated in FIG. 3. That is, when the push mode event requiring transmission/reception of a ping request message occurs, the interval setting unit 414 sets an HBI to a predetermined minimum value and provides the same to the activesync engine 412. After that, the interval setting unit 414 receives whether transmission/reception of a ping message succeeds from the activesync engine 412, determines whether the transmission/reception of the ping message succeeds or fails successively within a predetermined frequency, determines to change the HBI to a maximum value or end the push mode, and provides the result thereof to the activesync engine 410. After the HBI is changed to the maximum value, the interval setting unit 414 searches for an optimal HBI between the minimum value and the maximum value using the binary search technique. Again, the binary search technique is described later with reference to FIG. 6.

The storage unit 420 stores various programs for an overall operation of the client, and information regarding an HBI corresponding to last successful transmission/reception of a ping message, an HBI corresponding to last failed transmission/reception of a ping message, and a current HBI. Here, the interval information is updated whenever the ping message is transmitted/received.

The input unit 430 includes a plurality of numerical keys, letter keys, and function keys, and provides key input data corresponding to a key pressed by a user to the controller 400. The display unit 440 displays state information occurring during an operation of the client, numbers and letters, and a large amount of moving images and still images, etc. More particularly, according to an exemplary embodiment of the present invention, the display unit 440 displays a message recommendation to end the push mode because a current network state is not suitable for a push mode use to a user under control of the activesync engine 412 included in the controller 410.

Figure 5:
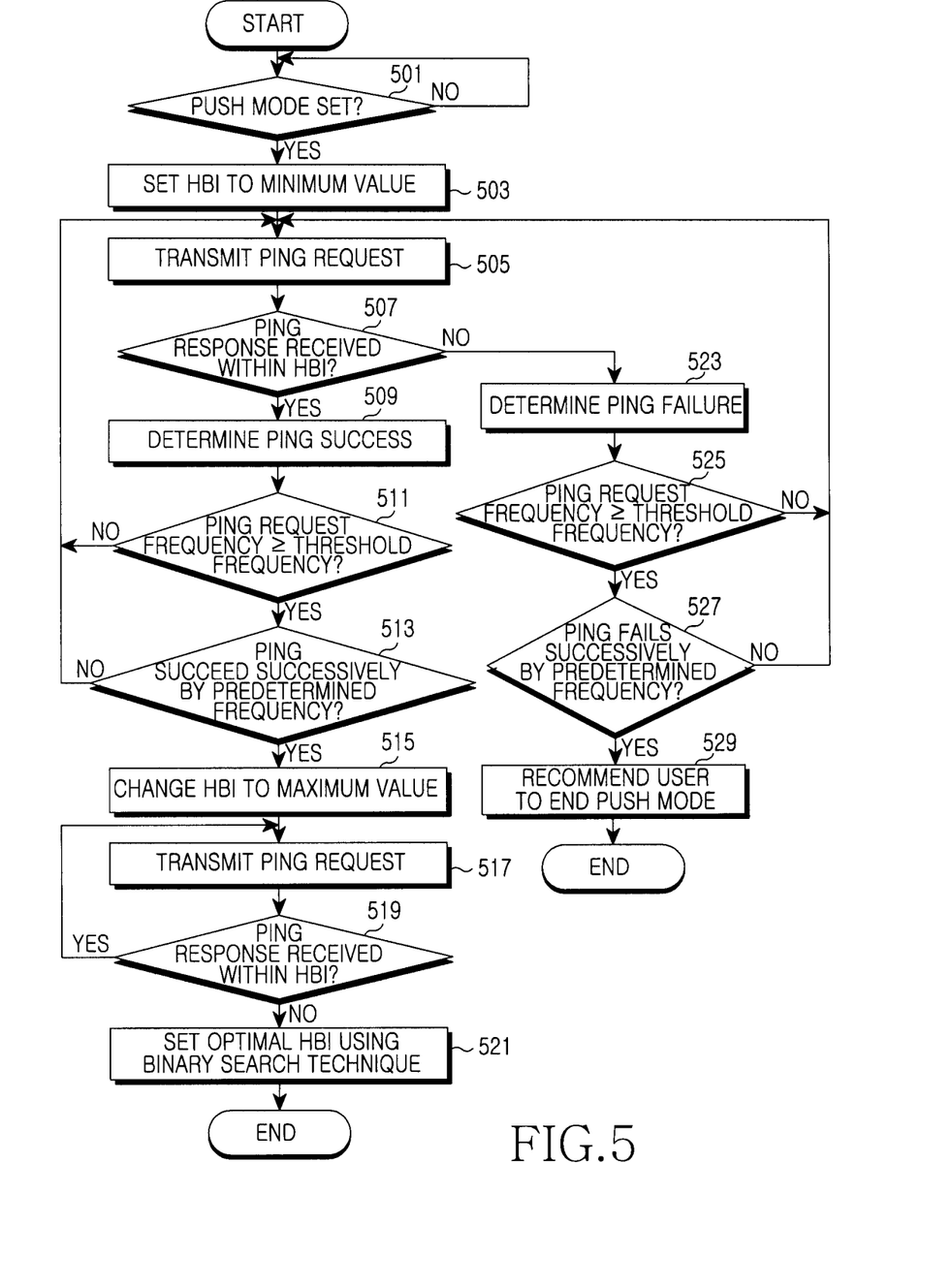
FIG. 5 is a flowchart illustrating an operation procedure of a client that determines an HBI in an exchange activesync based-network according to an exemplary embodiment of the present invention.

FIG. 5 is a flowchart illustrating an operation procedure of a client that determines a HeartBeat Interval (HBI) in an exchange activesync based-network according to an exemplary embodiment of the present invention.

Figure 7:
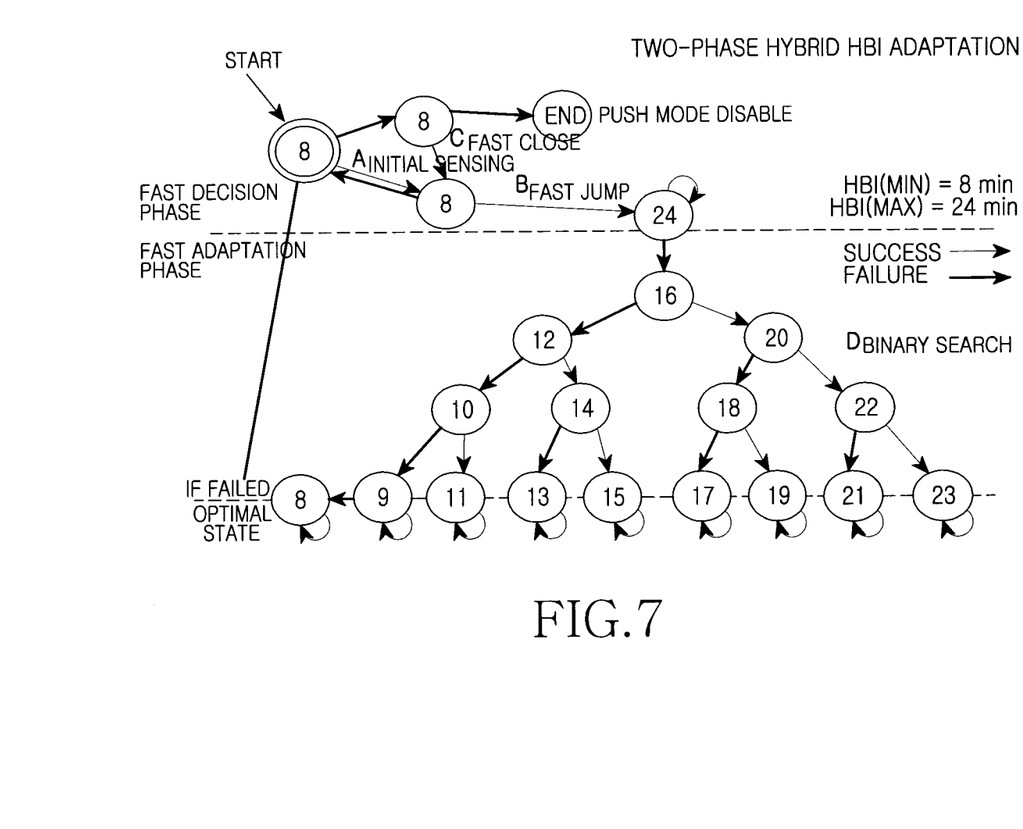
FIG. 7 is a view illustrating a method for controlling an HBI in an exchange activesync based-network according to an exemplary embodiment of the present invention.

Referring to FIG. 5, the client determines whether a push mode is set in step 501. When the push mode is set, the client sets an HBI to a predetermined minimum value in step 503. The client transmits a ping request message including the HBI set to the minimum value to an exchange server in step 505, and detects whether a ping response message is received within the HBI in step 507. For example, as illustrated in FIG. 7, when the predetermined minimum value is eight minutes, the HBI is set to eight minutes, a ping request message is transmitted, and whether a ping response message is received within eight minutes is detected.

When the ping response message is received within the set HBI, the client determines that transmission/reception of the ping message succeeds in step 509, and compares whether a frequency of transmission of the ping request message is equal to or greater than a predetermined threshold frequency in step 511. When the frequency of the transmission of the ping request message is smaller than the predetermined threshold frequency, the client returns to step 505 and re-performs subsequent steps. In contrast, when the frequency of the transmission of the ping request message is equal to or greater than the predetermined threshold frequency, the client determines whether the transmission/reception of the ping message has succeeded successively within the predetermined frequency in step 513. When the transmission/reception of the ping message has not succeeded successively within the predetermined frequency, the client returns to step 505 and re-performs subsequent steps.

In contrast, when the transmission/reception of the ping message has succeeded successively within the predetermined frequency, the client changes the HBI to a predetermined maximum value in step 515, and transmits a ping request message including the HBI set to the maximum value to the exchange server in step 517. For example, as illustrated in FIG. 7, when transmission/reception of a ping message succeeds successively two times with the HBI set to eight minutes, the client sets the HBI to twenty four minutes, which is a predetermined maximum value and transmits a ping request message.

The client determines whether a ping response message is received within the set HBI to the maximum value in step 519. When the ping response message is received within the HBI, the client returns to step 517 and re-performs subsequent steps. Here, since this is the case where the transmission/reception of the ping message has succeeded during the HBI set to the maximum value, the client determines the maximum value as the HBI and constantly tries transmission using the maximum value as the HBI until reception of the ping response message fails.

In contrast, when the ping response message is not received within the HBI in step 519, the client sets an optimal HBI using a binary search technique in step 521. For example, as illustrated in FIG. 7, when transmission/reception of a ping message fails with the HBI set to 24, which is a maximum value, the client sets an optimal HBI using the binary search technique. Here, the setting of the optimal HBI using the binary search technique is described in more detail later with reference to FIG. 6.

The client ends the algorithm after setting optimal HBI according to an exemplary embodiment of the present invention.

Meanwhile, when the ping response message is not received within the HBI set to the minimum value in step 507, the client determines that transmission/reception of the ping message fails in step 523, and compares a frequency of transmission of a ping request message is equal to or greater than a predetermined threshold frequency in step 525. When the frequency of transmission of the ping request message is smaller than the predetermined threshold frequency, the client returns to step 505 and re-performs subsequent steps. When the frequency of transmission of the ping request message is equal to or greater than the predetermined threshold frequency, the client determines whether the transmission/reception of the ping message has failed successively within the predetermined frequency in step 527. When the transmission/reception of the ping message has not failed successively within the predetermined frequency, the client returns to step 505 and re-performs subsequent steps.

In contrast, when the transmission/reception of the ping message has failed successively within the predetermined frequency, the client determines that a current network state is not suitable for transmission/reception of a ping message and recommends a user to end the push mode in step 529. For example, as illustrated in FIG. 7, when the transmission/reception of a ping message fails successively two times with the HBI set to 8, the client recommends a user to end the push mode.

After that, the client ends the algorithm according to an exemplary embodiment of the present invention.

Figure 6:
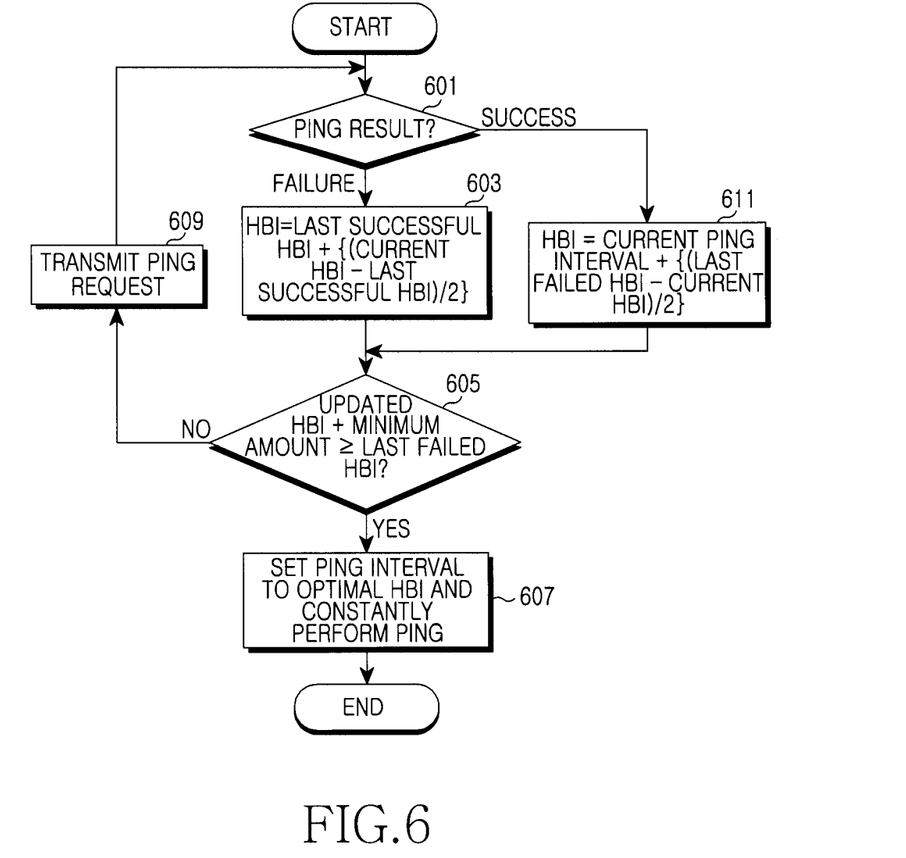
FIG. 6 is a flowchart illustrating an operation procedure of a client that determines an HBI using a binary search technique in an exchange activesync based-network according to an exemplary embodiment of the present invention.

FIG. 6 is a flowchart illustrating an operation procedure of a client that determines an HBI using a binary search technique in an exchange activesync based-network according to an exemplary embodiment of the present invention.

Referring to FIG. 6, the client determines a previous ping message transmission/reception result in step 601. That is, the client determines whether transmission/reception of a ping message corresponding to an HBI set to a maximum value succeeds.

When the transmission/reception of the previous ping message fails, the client updates an HBI using a last successful HBI and a current HBI as shown in Equation (1) in step 603, and proceeds to step 605.

$$HBI = \text{last successful HBI} + \{(\text{current HBI} - \text{last successful HBI})/2\} \quad (1)$$

Here, the last successful HBI denotes an HBI corresponding to the case where transmission/reception of a ping message succeeds last. For example, as illustrated in FIG. 7, in the case where a ping response message is not received within twenty four minutes with a current HBI set to twenty four minutes, when a last successful HBI is eight minutes, the client may reset the HBI to sixteen minutes ($16=8+\{(24-8)/2\}$).

In contrast, when the transmission/reception of the previous ping message succeeds, the client updates the HBI using a last failed HBI and a current HBI as shown in Equation (2) in step 611, and proceeds to step 605.

$$HBI = \text{current HBI} + \{(\text{last failed HBI} - \text{current HBI})/2\} \quad (2)$$

Here, the last failed HBI denotes an HBI corresponding to the case where transmission/reception of a ping message fails last. For example, as illustrated in FIG. 7, in the case where a ping response message is received within sixteen minutes with a current HBI set to sixteen minutes, when a last failed HBI is twenty four minutes, the client may reset the HBI to twenty minutes ($20=16+\{(24-16)/2\}$).

The client determines whether sum of the updated HBI and a predetermined threshold amount is equal to or greater than the last failed HBI in step 605. Here, when the sum is smaller than the last failed HBI, the client transmits a ping request message with the updated HBI in step 609, and returns to step 601 and re-performs subsequent steps. For example, as illustrated in FIG. 7, when an updated HBI is 18, a last failed HBI is 20, and the threshold amount is 1, the sum of the updated HBI and the threshold amount becomes 19, which is smaller than the last failed HBI. Therefore, the client returns to step 601 and re-performs subsequent steps.

In contrast, when the sum is equal to or greater than the last failed HBI, the client determines the HBI as an optimal HBI, constantly transmits/receives a ping message using the determined HBI, and ends the algorithm according to an exemplary embodiment of the present invention. For example, as illustrated in FIG. 7, when an updated HBI is 19, a last failed HBI is 20, and the threshold amount is 1, the sum of the updated HBI and the threshold amount becomes 20, which is equal to the last failed HBI. Therefore, the client determines the updated HBI, which is 19, as an optimal HBI.

Figure 8:
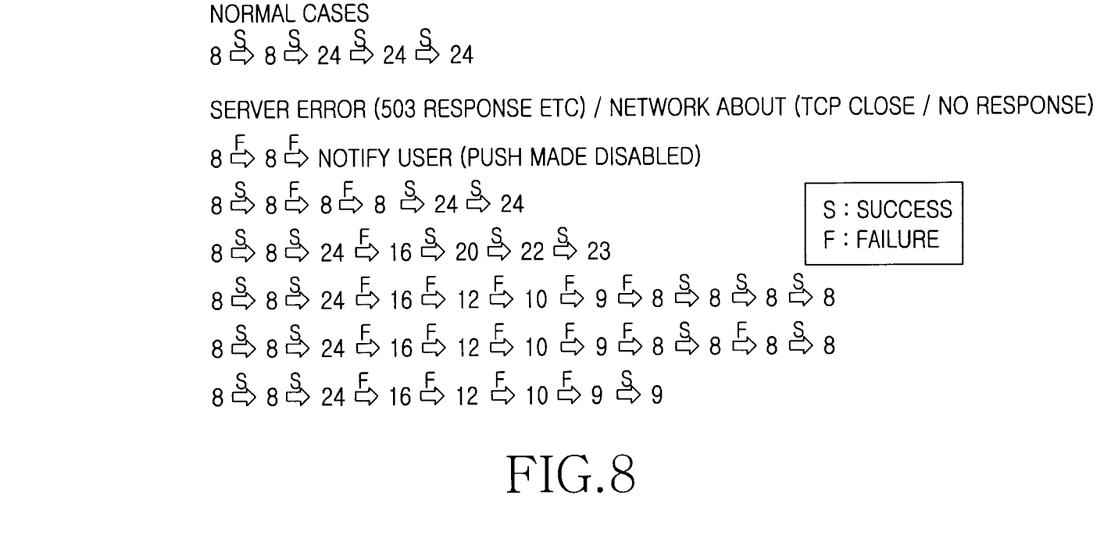
FIG. 8 is a view illustrating various examples in which an HBI is controlled depending on whether transmission/reception of a ping message succeeds in an exchange activesync based-network according to an exemplary embodiment of the present invention.

FIG. 8 is a view illustrating various examples in which an HBI is controlled depending on whether transmission/reception of a ping message succeeds in an exchange activesync based-network according to an exemplary embodiment of the present invention.

Referring to FIG. 8, in a normal case where a server error or a network error does not occur, the client transmits/receives a ping message by a predetermined frequency using a predetermined minimum value as an HBI, determines a predetermined maximum value as an HBI, and repeatedly transmits/receives a ping message. In contrast, when the server error or network error occurs, the HBI may be changed and set in various methods depending on whether transmission/reception of the ping message succeeds.

An exemplary embodiment of the present invention may determine an optimal HBI within a short time using a two-phase process of controlling an HBI of a ping by determining whether transmission/reception of a ping message succeeds successively within a predetermined frequency, and controlling the HBI using a binary search technique in a wireless communication system that uses an exchange activesync protocol. As a result, a service that uses the activesync protocol may be stably provided and optimally controlling the current consumption of the client.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method used in a client terminal for determining an optimal HeartBeat Interval (HBI) of a ping in a wireless communication system, the method comprising:

setting a predetermined minimum value as the HBI and performing transmission/reception of a ping message;

determining whether transmission/reception of a ping message corresponding to the set HBI is performed successfully;

when the transmission/reception of the ping message is determined to have succeeded for a predetermined number of successive times, setting the HBI to a predetermined maximum value;

performing the transmission/reception of the ping message using the HBI set to the predetermined maximum value; and when the transmission/reception of the ping message using the maximum value succeeds for the predetermined number of times, determining the maximum value as an optimal HBI.

2. The method of claim 1, further comprising, when the transmission/reception of the ping message fails successively for the predetermined number of times, ending the transmission/reception of the ping message.

3. The method of claim 1, further comprising, when the transmission/reception of the ping message using the maximum value fails updating the HBI using a transmission/reception result of a previous ping message, a current HBI, and an HBI of a previous ping.

4. The method of claim 3, wherein the updating of the HBI comprises, when transmission/reception of the previous ping message does not succeed for the predetermined number of times, updating the HBI using a last successful HBI and the current HBI as shown in Equation (3):

$$\text{HBI} = \text{last successful HBI} + \{(\text{current HBI} - \text{last successful HBI})/2\} \qquad (3).$$

5. The method of claim 3, wherein the updating of the HBI comprises, when transmission/reception of the previous ping message succeeds, updating the HBI using a last failed HBI and the current HBI as shown in Equation (4):

$$\text{HBI} = \text{current HBI} + \{(\text{last failed HBI} - \text{current HBI})/2\} \qquad (4).$$

6. The method of claim 3, further comprising:
comparing sum of the updated HBI and a predetermined threshold amount with a last failed HBI;
when the sum is smaller than the last failed HBI as a result of the comparison, re-updating the HBI using a transmission/reception result of the previous ping message, the current HBI, and the HBI of the previous ping; and
when the sum is equal to or greater than the last failed HBI as a result of the comparison, determining the updated HBI as the optimal HBI.

7. An apparatus for determining a HeartBeat Interval (HBI) of a ping in a wireless communication system, the apparatus comprising:
a transceiver for transmitting/receiving a ping message to/from an exchange server; and
a controller for setting a predetermined minimum value as an HBI, performing transmission/reception of a ping message, determining whether transmission/reception of a ping message corresponding to the set HBI is performed successfully for a predetermined number of successive times, and if so, setting the HBI to a predetermined maximum value,
wherein the controller performs the transmission/reception of the ping message using the HBI set to the predetermined maximum value, and when the transmission/reception of the ping message using the maximum value succeeds for the predetermined number of times, determines the maximum value as an optimal HBI.

8. The apparatus of claim 7, wherein when the transmission/reception of the ping message fails successively for the predetermined number of times, the controller ends the transmission/reception of the ping message.

9. The apparatus of claim 7, wherein when the transmission/reception of the ping message using the maximum value fails the controller updates the HBI using a transmission/reception result of a previous ping message, a current HBI, and an HBI of a previous ping.

10. The apparatus of claim 9, wherein when transmission/reception of the previous ping message fails, the controller updates the HBI using a last successful HBI and the current HBI as shown in Equation (5):

$$\text{HBI} = \text{last successful HBI} + \{(\text{current HBI} - \text{last successful HBI})/2\} \qquad (5).$$

11. The apparatus of claim 9, wherein when transmission/reception of the previous ping message succeeds, the controller updates the HBI using a last failed HBI and the current HBI as shown in Equation (6):

$$\text{HBI} = \text{current HBI} + \{(\text{last failed HBI} - \text{current HBI})/2\} \qquad (6).$$

12. The apparatus of claim 9, wherein the controller compares sum of the updated HBI and a predetermined threshold amount with a last failed HBI, when the sum is smaller than the last failed HBI, re-updates the HBI using a transmission/reception result of the previous ping message, the current HBI, and the HBI of the previous ping, and when the sum is equal to or greater than the last failed HBI, determines the updated HBI as the optimal HBI.

* * * * *